United States Patent
Chen et al.

(10) Patent No.: US 11,550,587 B2
(45) Date of Patent: Jan. 10, 2023

(54) SYSTEM, DEVICE, AND METHOD FOR OBTAINING INSTRUCTIONS FROM A VARIABLE-LENGTH INSTRUCTION SET

(71) Applicant: ALIBABA GROUP HOLDING LIMITED, Grand Cayman (KY)

(72) Inventors: Chen Chen, Shanghai (CN); Dongqi Liu, Hangzhou (CN); Tao Jiang, Hangzhou (CN); Chaojun Zhao, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 14 days.

(21) Appl. No.: 16/931,932

(22) Filed: Jul. 17, 2020

(65) Prior Publication Data

US 2021/0089311 A1 Mar. 25, 2021

(30) Foreign Application Priority Data

Sep. 23, 2019 (CN) .......................... 201910898789.X

(51) Int. Cl.
*G06F 9/38* (2018.01)
*G06F 9/48* (2006.01)
*G06F 9/34* (2018.01)

(52) U.S. Cl.
CPC .............. *G06F 9/3802* (2013.01); *G06F 9/34* (2013.01); *G06F 9/3836* (2013.01); *G06F 9/3867* (2013.01); *G06F 9/48* (2013.01)

(58) Field of Classification Search
CPC ........ G06F 9/3802; G06F 9/3867; G06F 9/48; G06F 9/34; G06F 9/3836; G06F 9/30152
See application file for complete search history.

(56) References Cited

U.S. PATENT DOCUMENTS

| 5,502,826 A * | 3/1996 | Vassiliadis | G06F 9/3853 |
| | | | 712/213 |
| 5,881,260 A * | 3/1999 | Raje | G06F 9/30152 |
| | | | 711/215 |
| 6,304,961 B1 * | 10/2001 | Yung | G06F 9/3844 |
| | | | 712/238 |
| 2002/0152368 A1 * | 10/2002 | Nakamura | G06F 9/3832 |
| | | | 712/226 |

(Continued)

OTHER PUBLICATIONS

International Search Report and written opinion in related International Application No. PCT/US2020/042490, dated Sep. 30, 2020 (13 pgs).

*Primary Examiner* — Farley Abad
(74) *Attorney, Agent, or Firm* — Finnegan, Henderson, Farabow, Garrett & Dunner, LLP

(57) ABSTRACT

An instruction processing device and an instruction processing method are disclosed. The instruction processing device includes: an instruction boundary prediction unit including circuitry configured to acquire an instruction packet of a variable-length instruction set and to add instruction prediction information to a plurality of instruction meta-fields in the instruction packet; and an instruction pipeline structure comprising an instruction fetch unit including an instruction boundary determination unit including circuitry configured to determine instruction boundary information according to the instruction prediction information to obtain one or more instructions in the instruction packet.

15 Claims, 10 Drawing Sheets

(56) References Cited

U.S. PATENT DOCUMENTS

| | | |
|---|---|---|
| 2014/0019722 A1 | 1/2014 | Nagao et al. |
| 2014/0281246 A1* | 9/2014 | Breternitz, Jr. ..... G06F 12/0875 |
| | | 711/125 |
| 2017/0083337 A1* | 3/2017 | Burger ................. G06F 9/3859 |

* cited by examiner

SYSTEM, DEVICE, AND METHOD FOR OBTAINING INSTRUCTIONS FROM A VARIABLE-LENGTH INSTRUCTION SET

CROSS REFERENCE TO RELATED APPLICATION

This disclosure claims the benefits of priority to Chinese application number 201910898789.X, filed Sep. 23, 2019, which is incorporated herein by reference in its entirety.

BACKGROUND

It is difficult to improve a processor architecture. Sometimes a good amount of effort may be made in research and development to make even a small progress. In the design of high-performance processors, pipeline stages may be reduced to improve a processor architecture. For example, pipeline stages, such as an instruction fetch stage, may not be optimized, thereby failing the time sequence requirement by adding additional pipeline stages, thus reducing the performance of the processors.

SUMMARY OF THE DISCLOSURE

According to some embodiments of the present disclosure, a device for processing an instruction in a variable-length instruction set is provided. The device comprises To achieve this objective, according to some embodiments of the present disclosure, the present disclosure provides an instruction processing device for processing instructions under a variable-length instruction set, including: an instruction boundary prediction unit including circuitry configured to acquire an instruction packet of the variable-length instruction set and to add instruction prediction information to a plurality of instruction meta-fields in the instruction packet; and an instruction pipeline structure comprising an instruction fetch unit including an instruction boundary determination unit including circuitry configured to determine instruction boundary information according to the instruction prediction information to obtain one or more instructions in the instruction packet.

In some embodiments, the instruction boundary prediction unit comprises circuitry configured to obtain the instruction prediction information of one or more instruction meta-fields by performing: determining a plurality of possible settings of a first instruction meta-field in the instruction packet of the variable-length instruction set; and determining instruction prediction information of a current instruction meta-field according to instruction prediction information and decoding information of a previous instruction meta-field.

In some embodiments, the instruction prediction information of the current instruction meta-field is determined according to instruction prediction information and decoding information of a number of previous instruction meta-fields, wherein the number is associated with a maximum instruction encoding length in the variable-length instruction set and a length of an instruction meta-field.

In some embodiments, the instruction boundary determination unit comprises circuitry configured to determine an instruction meta-field corresponding to a program pointer; obtain instruction prediction information of the instruction meta-field corresponding to the program pointer; determine whether the obtained instruction prediction information contains an entry indicating an instruction header; in accordance with the determination that the instruction prediction information of the instruction meta-field corresponds to the program pointer contains the entry indicating the instruction header, apply the entry to the instruction boundary information, and the one or more instructions are obtained based on the instruction boundary information.

In some embodiments, in accordance with the determination that the instruction prediction information of the instruction meta-field corresponds to the program pointer does not contain the entry indicating the instruction header, the instruction boundary determination unit comprises circuitry configured to call instruction boundary calculation unit to determine the instruction boundary information.

In some embodiments, the instruction processing device further includes an instruction cache for caching the instruction packet with the added instruction prediction information.

In some embodiments, the instruction processing device is a processor core.

In some embodiments, the instruction processing device is a processor.

According some embodiments of the present disclosure, an instruction processing method is provided. The method comprises: acquiring an instruction packet of a variable-length instruction set, and adding instruction prediction information to a plurality of instruction meta-fields in the instruction packet; and obtaining one or more instructions from the instruction packet at an instruction fetch stage of an instruction pipeline based on instruction boundary information determined according to the instruction prediction information.

In some embodiments, the instruction prediction information of each instruction meta-field is obtained by performing: determining a plurality of possible settings of a first instruction meta-field in the instruction packet of the variable-length instruction set; and determining instruction prediction information of a current instruction meta-field according to instruction prediction information and decoding information of a previous instruction meta-field.

In some embodiments, the instruction prediction information of the current instruction meta-field is determined according to instruction prediction information and decoding information of a number x of previous instruction meta-fields, wherein the number x is associated with a maximum instruction encoding length in the variable-length instruction set and a length of an instruction meta-field.

In some embodiments, the instruction processing method further comprises: determining an instruction meta-field corresponding to a program pointer; obtaining instruction prediction information of the instruction meta-field corresponding to the program pointer; determine whether the obtained instruction prediction information contains an entry; and in accordance with determine that the instruction prediction information of the instruction meta-field corresponding to the program pointer contains an entry indicating an instruction header, using the entry as the instruction boundary information, and obtaining the one or more instructions based on the instruction boundary information.

In some embodiments, the instruction processing method further includes: in accordance with determine that the instruction prediction information of the instruction meta-field corresponding to the program pointer does not contain an entry indicating an instruction header, recalculating the instruction boundary information.

In some embodiments, the instruction processing method further includes: caching the instruction packet with the added instruction prediction information.

According to some embodiments of the present disclosure, a computer system including: a memory; and a processor coupled to the memory is provided. The processor comprises: an instruction boundary prediction unit including circuitry configured to acquire an instruction packet of a variable-length instruction set and to add instruction prediction information to a plurality of instruction meta-fields in the instruction packet; and an instruction pipeline structure, comprising an instruction fetch unit including an instruction boundary determination unit including circuitry configured to determine instruction boundary information according to the instruction prediction information to obtain one or more instruction in the instruction packet.

According to some embodiments of the present disclosure, a system on chip including an instruction processing device is provided. The instruction processing device comprises an instruction boundary prediction unit including circuitry configured to acquire an instruction packet of the variable-length instruction set and to add instruction prediction information to a plurality of instruction meta-fields in the instruction packet; and an instruction pipeline structure comprising an instruction fetch unit including an instruction boundary determination unit including circuitry configured to determine instruction boundary information according to the instruction prediction information to obtain one or more instructions in the instruction packet.

BRIEF DESCRIPTION OF THE DRAWINGS

The above and other objects, features, and advantages of the present disclosure will be clearer by describing the embodiments of the present disclosure with reference to the following drawings. In the drawings.

DETAILED DESCRIPTION

Figure 1:
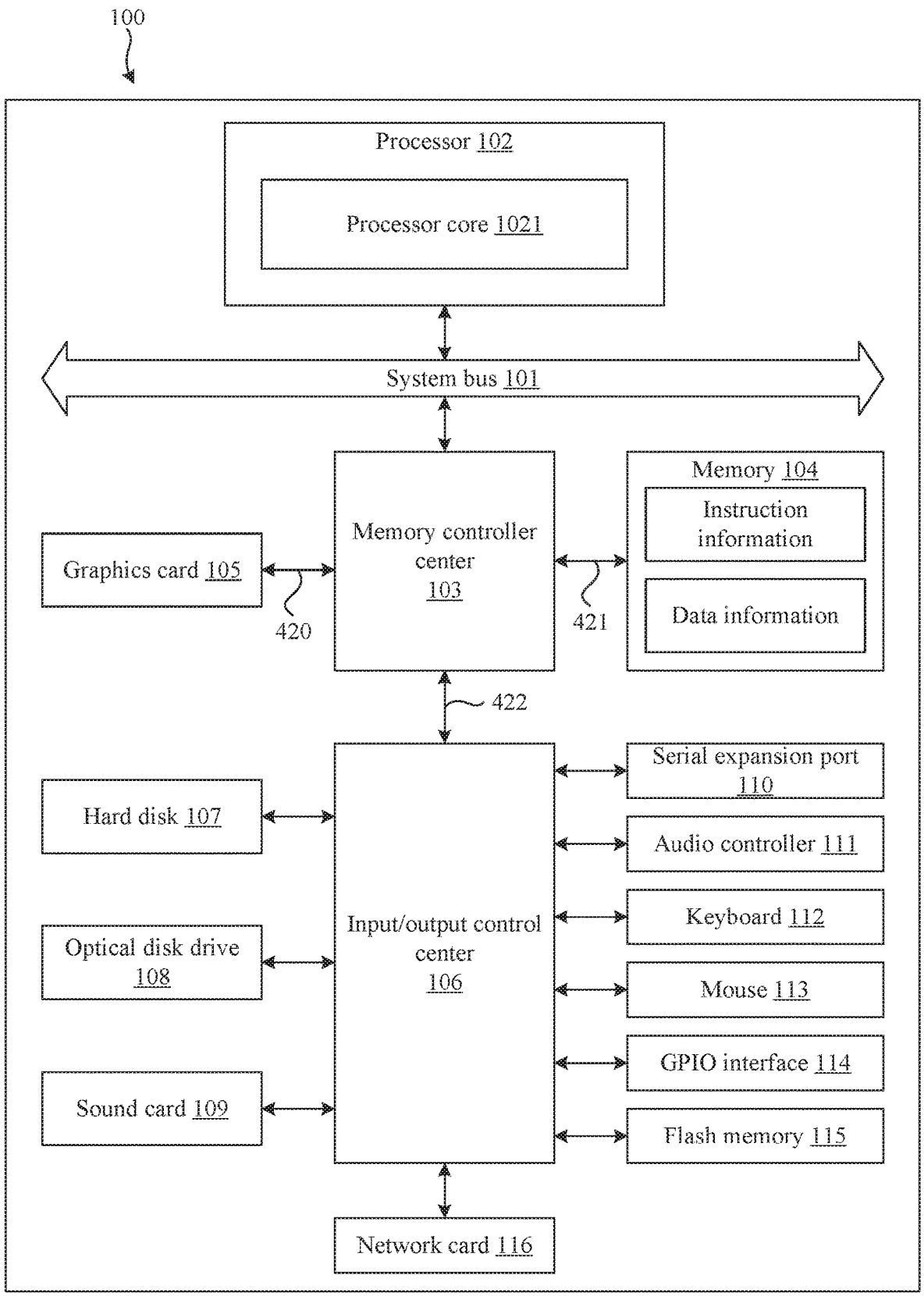
FIG. 1 is a schematic structural diagram of an example computer system according to some embodiments of the present disclosure.

The present disclosure is described below based on various embodiments, but the present disclosure is not limited to these embodiments. In the following detailed description of the present disclosure, some specific details are described in detail. Those skilled in the art can fully understand the present disclosure without the description of these details. In order to avoid confusion with the essence of the present disclosure, well-known methods, processes, and flows may not be described in detail. In addition, the drawings are not necessarily drawn to scale.

In a pipeline structure, the main task of an instruction fetch stage may include acquiring an instruction packet of a fixed length from an instruction cache or an external bus according to an instruction packet address. After obtaining the instruction packet, to obtain one or more instructions from the instruction packet, the position of a valid instruction in the instruction packet may be determined according to a value of the point counter (PC) of an instruction. Instruction meta-fields in the valid instruction may be decoded one by one to determine whether each instruction meta-field is an instruction header. Then, the boundary of each instruction may be confirmed in sequence from front to back according to the value of the PC and the instruction header information of each instruction meta-field. The instruction packet may then be split into one or more valid or correct instructions.

The instruction fetch stage may include two functions:

1) packaging instruction information, and storing the same in an instruction cache; and 2) obtaining at least a part of decoding information of an instruction, including for example, whether the instruction is a branch instruction, a function return instruction, or the like. The execution flow of a program may be changed based on these types of information, such as skipping based on branch prediction information, and starting instruction fetching of a new instruction flow based on a function return address predicted by a function return predictor.

Conventionally, instruction boundary information may be decoded after an instruction packet is obtained. Accordingly, the above-described two functions may not be achieved at the same time in an instruction fetch stage. For high-performance processors, since the time sequence requirement may not be met, additional pipeline stages may be added, thereby slowing down the performance of the processors. For example, for a branch instruction, it may be delayed for one cycle later to obtain information about whether to skip.

Some embodiments of the present disclosure have the advantage including: before an instruction enters the instruction pipeline structure, instruction prediction information can be added to each instruction meta-field in the instruction packet, so that the instruction fetch unit can determine instruction boundary information according to the instruction prediction information. As such, the instruction boundary information can be determined more quickly without spending excessive time, thereby avoiding the problem that additional pipeline stages may be added due to lack of enough time to pre-decode current instructions (such as branch instructions) in a current instruction fetch cycle.

In some embodiments, a variable-length instruction set includes instructions with instruction encoding lengths that are variable lengths. For example, the instruction set may include both instructions encoded in 16 bits and instructions encoded in 32 bits.

In some embodiments, an instruction packet is a fixed-length binary segment acquired by a processor from an instruction cache or an external bus.

In some embodiments, instruction prediction information includes prediction information configured to indicate whether an instruction meta-field is an instruction header, an instruction tail, or various segments in the middle of an instruction.

In some embodiments, instruction header information is configured to indicate whether an instruction meta-field in an instruction packet is an instruction header. If instruction header information of all instruction meta-fields in the instruction packet is determined, instruction boundary information is also determined.

In some embodiments, instruction boundary information may refer to a position of an instruction header of an instruction on a continuous address. In a variable-length encoded instruction set, instructions are not aligned in memory in accordance with addresses. As such, the boundary of each instruction, such as the position of the instruction header, needs to be acquired. In the present disclosure, the instruction header information and the instruction boundary information may include information obtained via comparing, analyzing, and confirming the instruction prediction information, or information obtained through an instruction boundary calculation unit. This information can basically be regarded as the real instruction boundary information, unless the calculation or prediction is wrong.

In some embodiments, instruction meta-fields include fields extracted from an instruction packet according to the greatest common divisor of all instruction encoding lengths in a variable-length instruction set. For example, if an instruction packet contains two kinds of instruction codes, and the instruction encoding lengths are 8 bits and 16 bits respectively, then instruction meta-fields are extracted from the instruction packet according to 8 bits.

In some embodiments, an instruction cache includes a level-1 cache configured to store instructions.

In some embodiments, Program PC may refer to a program pointer.

In some embodiments, an instruction pipeline refers to a way of dividing an operation of an instruction into multiple small steps, where each step may be completed by an specialized circuit or circuitry, to improve the efficiency of executing instructions by a processor. Instruction pipeline technologies may include three-stage, four-stage, five-stage, seven-stage, or super instruction pipelines, and so on. For example, a five-stage instruction pipeline includes an instruction fetch stage, a decoding stage, an execution stage, a memory access stage, and a write-back stage. In the present disclosure, the instruction fetch stage, decoding stage, execution stage, memory access stage, and write-back stage may be referred to as instruction fetch unit, decoding unit, execution unit, memory access unit, and retirement unit respectively. A combination of software and hardware that implements an instruction pipeline may be referred to as an instruction pipeline structure.

FIG. 1 is a schematic structural diagram of a computer system 100 according to some embodiments of the present disclosure. Referring to FIG. 1, system 100 is an example of a "central" system architecture. System 100 may be constructed based on various types of processors currently on the market and may be driven by operating systems such as a WINDOWS™ operating system version, a UNIX operating system, and a Linux operating system, etc. In addition, system 100 can be generally implemented in a PC, a desktop, a notebook, or a server.

In some embodiments, as shown in FIG. 1, system 100 includes a processor 102. Processor 102 has a data processing capability known in the art. It can be a processor with a complex instruction set (CISC) architecture, a reduced instruction set (RISC) architecture, and a very long instruction word (VLIW) architecture, or a processor that implements a combination of the above instruction sets, or any purpose-built processor device.

In some embodiments, processor 102 is coupled to system bus 101, and system bus 101 can transmit data signals between processor 102 and other components. In some embodiments, processor 102 further includes a processor core 1021 improved according to some embodiments of the present disclosure, and specific details thereof will be provided below.

In some embodiments, system 100 further includes memory 104 and a graphics card 105. Memory 104 may be a dynamic random access memory (DRAM) device, a static random access memory (SRAM) device, a flash memory device, or other memory devices. Memory 104 may store instruction information or data information represented by data signals. In some embodiments, graphics card 105 includes a display driver configured to control correct display of display signals on a display screen.

In some embodiments, graphics card 105 and memory 104 are coupled to system bus 101 via a memory controller center 103. Processor 102 may communicate with memory controller center 103 via system bus 101. In some embodiments, memory controller center 103 provides a high-bandwidth memory access path 421 to memory 104 for storing and reading instruction information and data information. At the same time, memory controller center 103 and graphics card 105 can transmit display signals based on a graphics card signal input/output interface 420. In some embodiments, graphics card signal input/output interface 420 is of, for example, an interface type such as DVI and HDMI.

In some embodiments, memory controller center 103 not only transmits digital signals between processor 102, memory 104, and graphics card 105, but also realizes bridging of digital signals between system bus 101 and memory 104 as well as an input/output control center 106.

In some embodiments, system 100 further includes input/output control center 106 that is coupled to memory controller center 103 through dedicated hub interface bus 422. In some embodiments, some I/O devices are connected to input/output control center 106 via a local I/O bus. The local I/O bus may be configured to couple peripheral devices to input/output control center 106, and then to memory controller center 103 and system bus 101. In some embodiments, the peripheral devices include, but are not limited to, a hard disk 107, an optical disk drive 108, a sound card 109, a serial expansion port 110, an audio controller 111, a keyboard 112, a mouse 113, a GPIO interface 114, a flash memory 115, or a network card 116.

It is appreciated that different computer systems may have different structural diagrams depending on different motherboards, operating systems, or instruction set architectures. For example, some computer systems may integrate memory controller center 103 into processor 102, so that input/output control center 106 becomes a control center coupled to processor 102.

Figure 2:
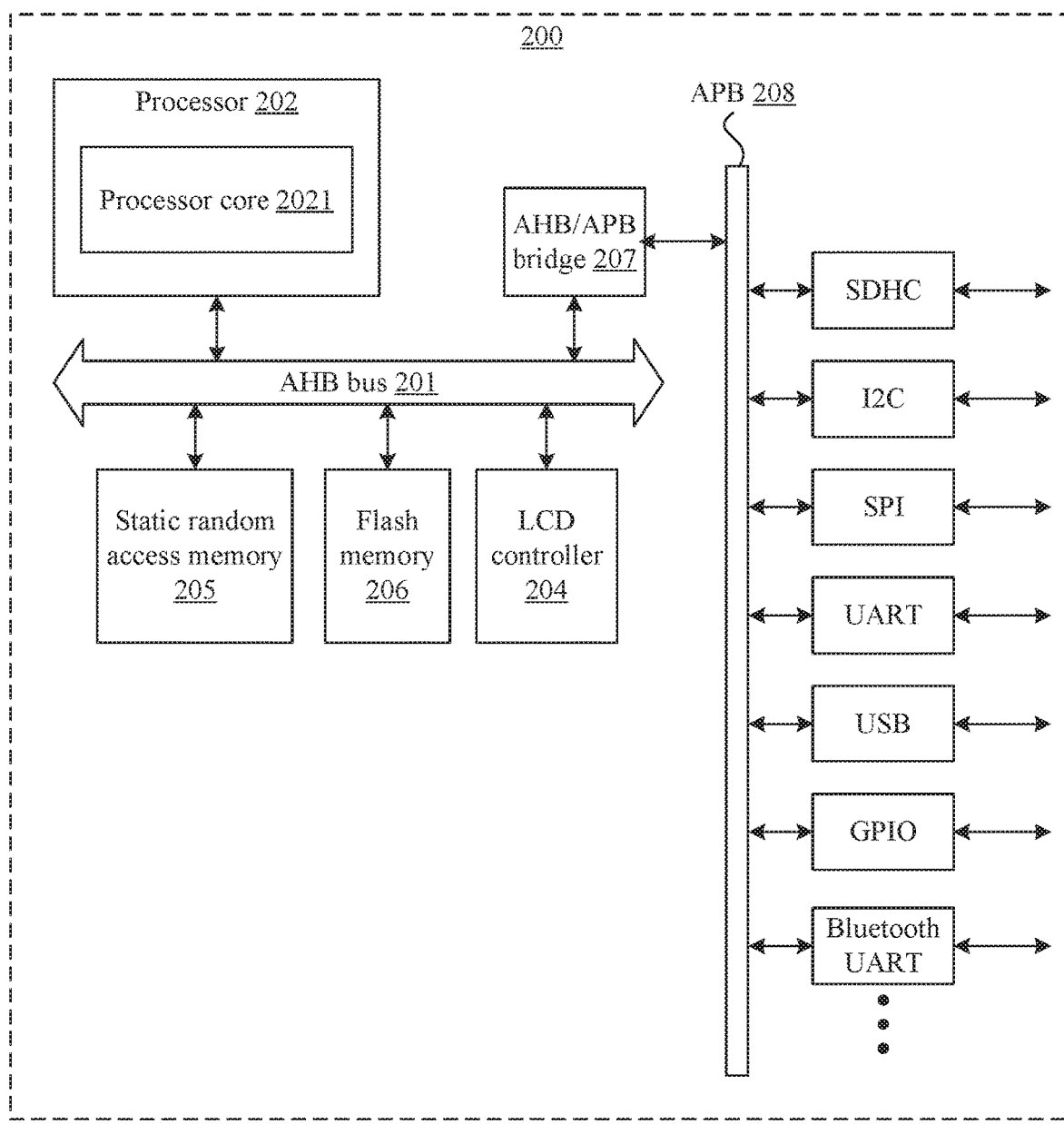
FIG. 2 is a schematic structural diagram of an example system on chip according to some embodiments of the present disclosure.

FIG. 2 is a schematic structural diagram of a system on chip 200 (e.g., also referred to as "system 200") according to some embodiments of the present disclosure. As a system on chip, system 200 may be produced and sold as an independent device, or may be combined with other components to form a new device for production and sale.

In some embodiments, system 200 may be manufactured using various types of processors and may be driven by operating systems such as WINDOWS™, UNIX, Linux, Android, RTOS, and so on. System 200 may be implemented in computer devices, handheld devices, or embedded products. Some examples of handheld devices may include cellular phones, Internet protocol devices, digital cameras, personal digital assistants (PDA), or handheld PCs. Embedded products may include network computers (NetPC), set-top boxes, network hubs, wide area network (WAN) switches, or any other system that can execute one or more instructions.

In some embodiments, referring to FIG. 2, system 200 includes a processor 202, a static random access memory 205, an LCD controller 204, a flash memory 206, and an AHB/APB bridge 207 coupled via an advanced high performance bus (AHB) 201.

In some embodiments, processor 202 may be one of a complex instruction set (CISC) microprocessor, a reduced instruction set (RISC) microprocessor, a very long instruction word (VLIW) microprocessor, a microprocessor that implements a combination of one or more of the above instruction sets, or any other processor device. Processor 202 may further include a processor core 2021 improved according to some embodiments of the present disclosure, and specific details thereof will be provided below.

In some embodiments, static random access memory 205 and flash memory 206 are configured to store instruction information or data information represented by digital signals. For example, static random access memory 205 may be used as a running space for various applications, and may create heaps, stacks, or store intermediate data for various applications. Flash memory 206 may store executable codes of various applications or executable codes of the operating system.

In some embodiments, AHB 201 is configured to transmit digital signals between high-performance modules of system 200, for example, transmitting digital signals between processor 202 and static random access memory 205, between processor 202 and LCD controller 204, between processor 202 and flash memory 206, and between processor 202 and AHB/APB bridge 207.

In some embodiments, AHB/APB bridge 207 is configured to bridge data transmission between the AHB and an APB 208. For example, AHB/APB bridge 207 may generate selection signals of APB peripheral devices by latching addresses, data, and control signals from the AHB and providing secondary decoding, thereby realizing the conversion from an AHB protocol to an APB protocol.

In some embodiments, system 200 may further include various interfaces coupled to the APB 208. The various interfaces include, but are not limited to, the following interface types: high-capacity SD memory card (SDHC, secure digital high capacity), I2C bus, serial peripheral interface (SPI), universal asynchronous receiver/transmitter (UART), universal serial bus (USB), general-purpose input/output (GPIO), and Bluetooth UART. In some embodiments, peripheral devices coupled to the interfaces are, for example, USB devices, memory cards, message transceivers, Bluetooth devices, and so on.

It should be noted that the systems shown in FIGS. 1 and 2 are only used to illustrate application scenarios of the embodiments of the present disclosure, and are not intended to limit the embodiments of the present disclosure. It is appreciated that the processor or processor core improved according to the embodiments of the present disclosure can be applied to systems having any processor architecture.

Figure 3:
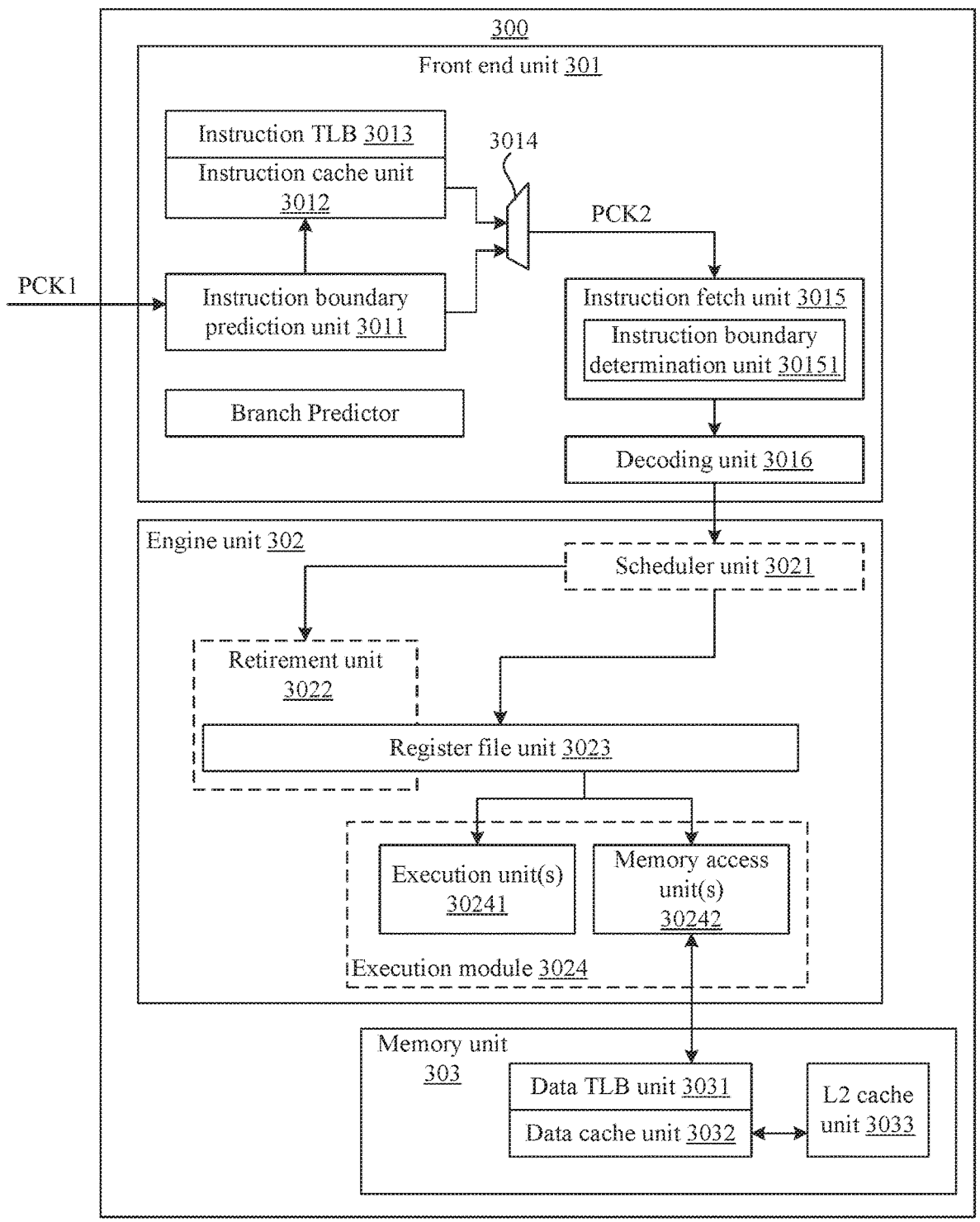
FIG. 3 is a schematic structural diagram of an example processor core according to some embodiments of the present disclosure.

FIG. 3 is a schematic structural diagram of a processor core 300 according to some embodiments of the present disclosure. In FIG. 3, arrows indicate coupling relations between two or more units and data transmission directions between two units.

As shown in FIG. 3, in some embodiments, processor core 300 includes a front-end unit 301, an engine unit 302, and a memory unit 303 coupled to a system.

In some embodiments, front-end unit 301 includes an instruction boundary prediction unit 3011, an instruction cache unit 3012, an instruction translation lookaside buffer (TLB) 3013, an AND-OR gate 3014 (e.g., a combined gate circuit, including multiple AND gate circuits connected by one or more OR gate circuits for receiving at least three inputs to generate one output), an instruction fetch unit 3015, and a decoding unit 3016 that are coupled to each other. In some embodiments, instruction cache unit 3012 may be further coupled to level-2 (L2) cache unit 3033 in memory unit 303 to facilitate the transmission of instruction data.

In some embodiments, instruction packet PCK1 is received from processor core 300, other components in the processor, or is provided by a bus. In some embodiments, instruction boundary prediction unit 3011 acquires and parses instruction packet PCK1, adds instruction prediction information to each instruction meta-field in instruction packet PCK1, and obtains instruction packet PCK2 (e.g., including PCK1 and the instruction prediction information). In some embodiments, instruction boundary prediction unit 3011 may store instruction packet PCK2 into instruction cache unit 3012, or directly send instruction packet PCK2 to instruction fetch unit 3015 for processing. For illustration purpose, AND-OR gate 3014 is used in FIG. 3 to indicate that the input of instruction fetch unit 3015 may be directly from an output of instruction boundary prediction unit 3011, or may be from instruction cache unit 3012. In some embodiments, instruction fetch unit 3015 includes an instruction boundary determination unit 30151. In some embodiments, instruction fetch unit 3015 acquires a physical address from instruction TLB unit 3013 according to a program PC, and acquires an instruction packet from instruction cache unit 3012 accordingly. Instruction fetch unit 3015 may then call instruction boundary determination unit 30151 to determine instruction boundary information according to prediction information. Instruction fetch unit 3015 may further obtain a plurality of instructions from the instruction packet according to the instruction boundary information, and pre-decode each instruction to obtain pre-decoding information, such as whether the instruction is a branch instruction, a skip direction and a target address of a branch instruction, and so on.

In some embodiments, decoding unit 3016 can decode instructions according to an instruction set architecture, determine what operations the instructions correspond to, and how an instruction pipeline processes the instructions. In some embodiments, the instruction set architecture is determined by a processor manufacturer. When a program is compiled into an executable form, a compiler uses instructions defined in the instruction set architecture to organize executable codes. If the compiler uses an undefined instruction, decoding unit 3016 cannot understand the meaning of the undefined instruction, and the instruction decoding fails.

In some embodiments, decoding unit 3016 may be further coupled to a scheduler unit 3021 in engine unit 302. Engine unit 302 may include scheduler unit 3021, a retirement unit 3022, a register file unit 3023, and an execution module 3024 that are coupled to each other (e.g., as shown in FIG. 3). Scheduler unit 3021 may be coupled to register file unit 3023. Scheduler unit 3021 may schedule a plurality of instructions in the instruction pipeline, for example, adjusting the order of instruction execution in the instruction pipeline (e.g., out-of-order execution, etc.), or routing one instruction to a plurality of execution units at the same time. In some embodiments, decoding unit 3016 and scheduler unit 3021 may also be combined into one unit.

In some embodiments, register file unit 3023 represents one or more physical register files. Different physical register files may store one data type or different data types (for example, scalar integer, scalar floating point, packed integer, packed floating point, vector integer, or vector floating point, etc.), or status (such as an instruction PC of a next instruction), etc. In some embodiments, register file unit 3023 may be covered by retirement unit 3022 to implement multiple ways of register renaming and out-of-order execution.

Examples of registers in the physical register file include, but may not be limited to, dedicated physical registers, dynamically allocated physical registers using register renaming, or combinations of dedicated physical registers and dynamically allocated physical registers, etc.

In some embodiments, retirement unit 3022 and physical register file unit 3023 may be coupled to execution module 3024. In some embodiments, execution module 3024 includes one or more execution units 30241 and one or more memory access units 30242. Each execution unit 30241 may perform operations (e.g., shift, addition, subtraction, or multiplication) corresponding to one type of data. Memory access units 30242 may be coupled to memory unit 303. In some embodiments, memory unit 303 may include data TLB unit 3031 coupled to data cache unit 3032, where data cache unit 3032 is coupled to a level-2 (L2) cache unit 3033. In some embodiments, L2 cache unit 3033 may further be coupled to one or more caches of other levels (not shown), and eventually coupled to a main memory (e.g., a memory coupled to the system bus). It is appreciated that instruction cache unit 3012, data cache unit 3032, and L2 cache unit 3033 are shown in FIG. 3 for illustrative purpose and do not intend to be limiting. One or more caches or cache units may be inside the core, outside the core, or partially inside the core and partially outside the core, or in different combinations in other embodiments. It is further appreciated that although the embodiments shown in the processor of FIG. 3 may include separate instructions and data cache units and a shared L2 cache unit, other embodiments may have a single internal cache for both instructions and data. In some embodiments, the system may include a combination of an internal cache and an external cache outside the core or processor. In other embodiments, all caches may be outside the core or processor.

In some embodiments, instruction fetch unit 3015, decoding unit 3016, scheduler unit 3021, and execution module 3024 may process instructions at different speeds. Accordingly, an instruction cache may be set between any two units thereof, or different numbers of units may be set to adjust the speed difference. For example, one instruction fetch unit may correspond to a plurality of execution modules 3024.

Although instruction fetch unit 3015, decoding unit 3016, scheduler unit 3021, execution unit 30241, memory access unit 30242, and retirement unit 3022 in FIG. 3 are used to implement an instruction pipeline structure (e.g., here instruction boundary prediction unit 3011 is not a component of the instruction pipeline structure), it is appreciated that it is not intended to be limiting. A person skilled in the art may use other instruction pipelines, such as a standard five-stage pipeline structure, or a super instruction pipeline structure, to implement the embodiments of the present disclosure, which are included in the scope of the present disclosure.

The embodiments of the present disclosure have advantages such as: the instruction prediction information can be added to each instruction meta-field before the instruction enters the instruction pipeline structure. Accordingly, the instruction fetch unit can determine instruction boundary information more efficiently according to the instruction prediction information, to avoid spending more logic length to determine the instruction boundary information. Further, the problem that additional pipeline stages need to be added due to not enough time to pre-decode instructions (such as branch instructions) in a current instruction fetch cycle can be avoided. When the instruction fetch unit cannot determine a current instruction as a branch instruction in time in the current instruction fetch cycle, it cannot acquire an instruction packet from a skipping target address in time. Accordingly, an empty shot may be added to the instruction pipeline to wait to acquire the instruction packet from the skipping target address.

Various embodiments of instruction boundary prediction unit 3011 and instruction boundary determination unit 30151 are described below in detail.

Figure 4:
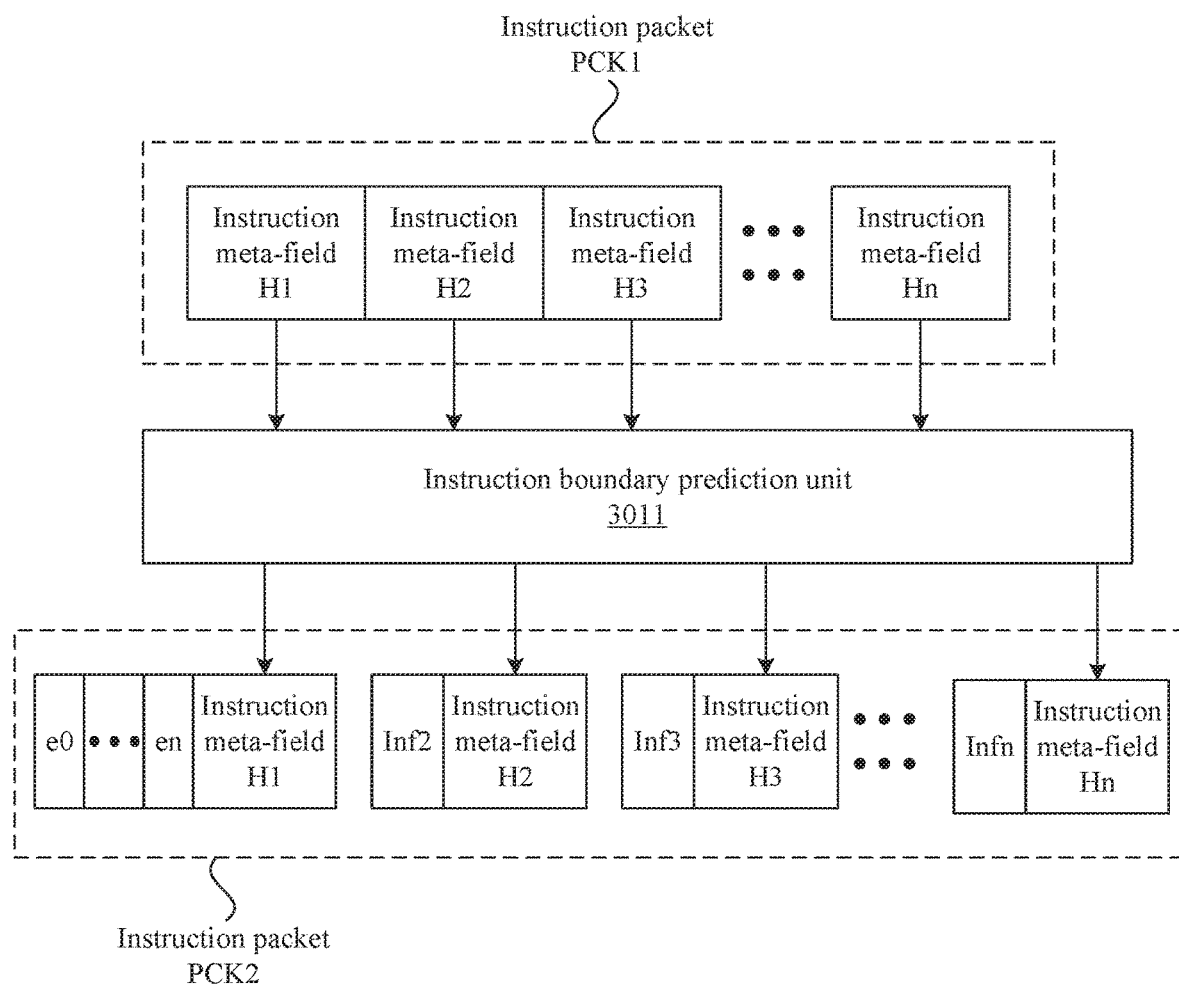
FIG. 4 is a schematic diagram of an example input and output of instruction boundary prediction unit in FIG. 3 according to some embodiments of the present disclosure.

FIG. 4 is a schematic diagram of input and output of instruction boundary prediction unit 3011 in FIG. 3 according to some embodiments of the present disclosure. Referring to FIG. 4, instruction boundary prediction unit 3011 may acquire an instruction packet PCK1 including instruction meta-fields H1 to Hn. Instruction boundary prediction unit 3011 may output an instruction packet PCK2 including prediction information added to respective instruction meta-fields. As shown in FIG. 4, prediction information of instruction meta-field H1 is shown as e0 to en, and prediction information of instruction meta-fields H2 to Hn is shown as inf2 to infn. In some embodiments, prediction information of a current instruction meta-field may be determined based on prediction information of a previous instruction meta-field. For the first instruction meta-field, instruction meta-field H1 does not have a previous instruction meta-field. Accordingly, e0 to en can represent various hypotheses associated with instruction meta-field H1. For example, e0 represents that instruction meta-field H1 is an instruction header, e1 indicates that instruction meta-field H1 is not an instruction header, etc. Thereafter, prediction information inf2 of instruction meta-field H2 may be obtained according to the various hypotheses e0 to en. Further, the prediction information of instruction meta-field H3 can be obtained according to the various hypotheses e0 to en and prediction information inf2. Similarly, prediction information of one or more other instruction meta-fields can be determined.

Based on FIG. 4, in some embodiments, the logic for solving the prediction information includes: instruction prediction information of a current instruction meta-field may be obtained according to instruction prediction information and decoding information of one or more (x) previous instruction meta-fields, where x=A/B−1, A representing a maximum instruction encoding length in a variable-length instruction set, and B representing a length of an instruction meta-field. Two examples are given below to illustrate how this method works without limiting the scope of the present disclosure.

The first example corresponds to a prediction logic of 16/32 bit variable-length instruction set. The instruction encoding lengths of the 16/32 bit variable-length instruction set include 16 bits and 32 bits. Accordingly, the length of a respective instruction meta-field is 16 bits, and the value of x is 1. According to the above formula, instruction prediction information of an instruction meta-field may be obtained based on instruction prediction information and decoding information of the previous instruction meta-field. For a 16/32 bit mixed instruction, there are two hypotheses for each instruction meta-field: the instruction meta-field is an instruction header, or is not an instruction header.

Figure 5A:
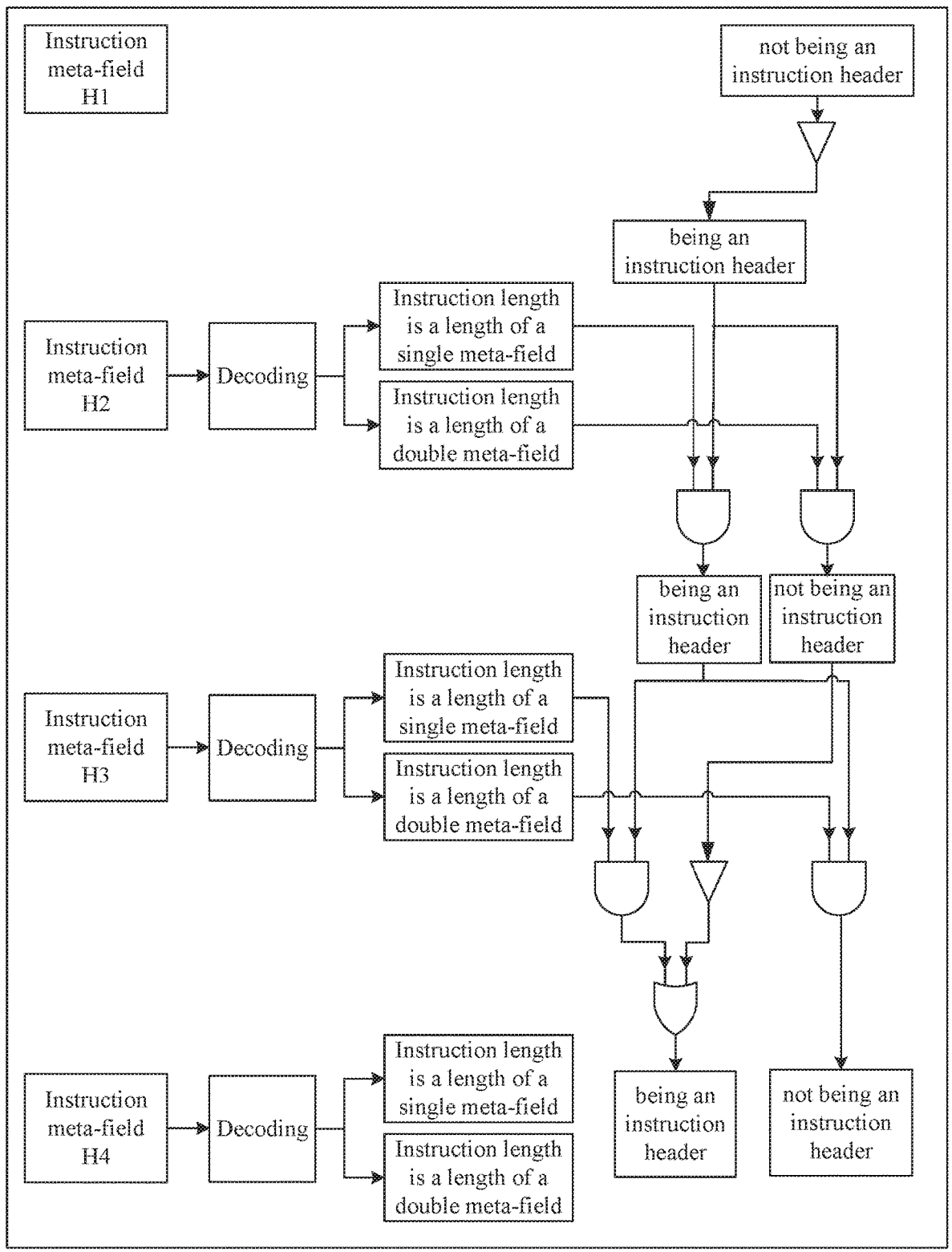
FIG. 5A and FIG. 5B are respective schematic diagrams showing exemplary prediction logic of a 16/32 bit variable-length instruction set according to some embodiments of the present disclosure.
Figure 5B:
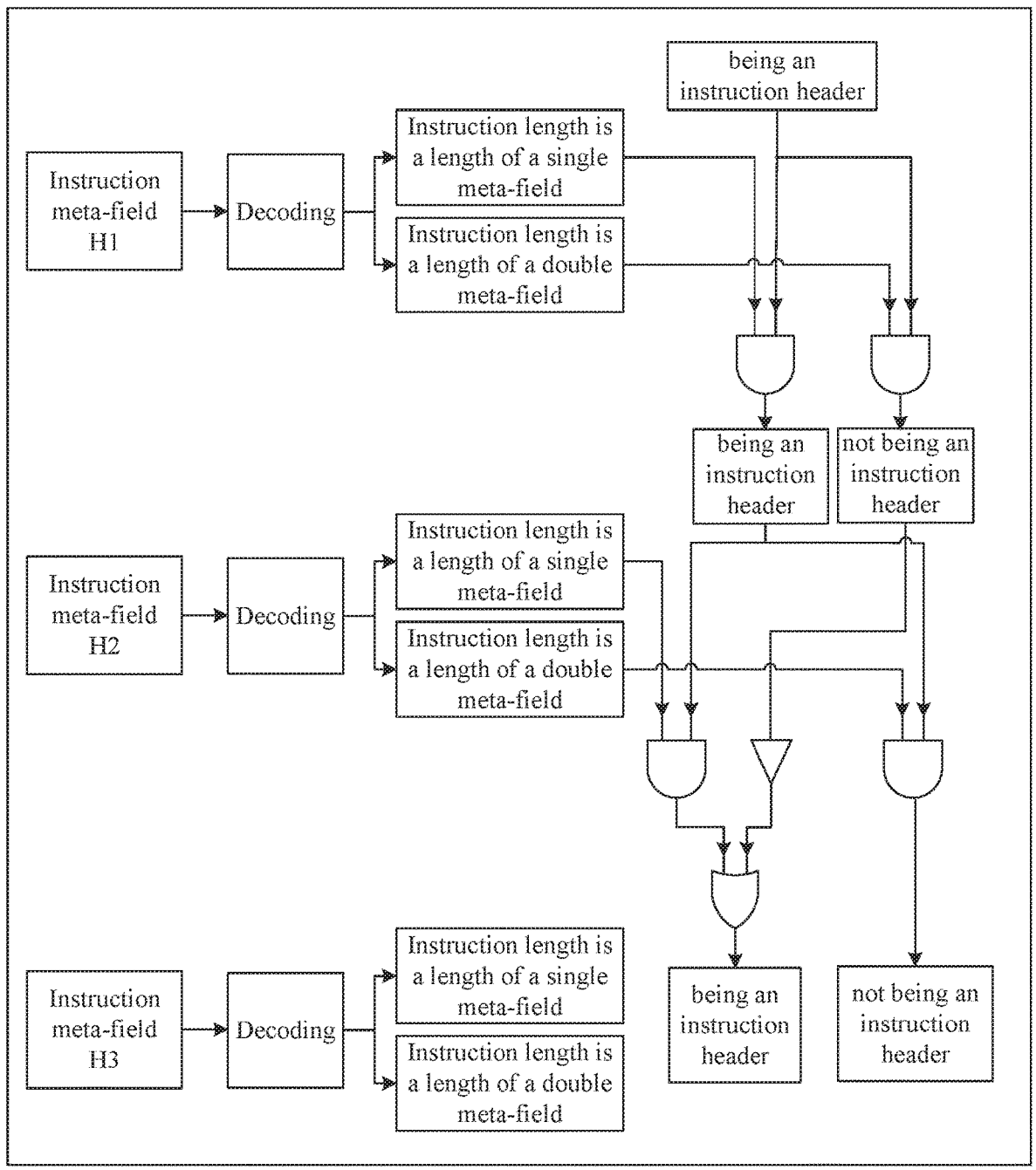

FIG. 5A and FIG. 5B are respective schematic diagrams showing prediction logic of a 16/32 bit variable-length instruction set associated with two hypotheses including that instruction meta-field H1 is not an instruction header and is an instruction header, respectively, according to some embodiments of the present disclosure.

Referring to FIG. 5A, the logic solution corresponds to the hypothesis that instruction meta-field H1 is not an instruction header. Assuming H1 is not an instruction header, H2 is an instruction header. Instruction meta-field H2 can be decoded to determine whether instruction meta-field H2 has a length of a single meta-field (16 bits), or a length of a double meta-field (32 bits). When instruction meta-field H2 has a length of a single meta-field, instruction meta-field H3 is an instruction header. When instruction meta-field H2 has a length of a double meta-field, H3 is not an instruction header. Instruction meta-field H3 is then decoded to determine whether instruction meta-field H3 has a length of a single meta-field (16 bits) or a length of a double meta-field. When instruction meta-field H3 is a single meta-field, instruction meta-field H4 is an instruction header. When instruction meta-field H3 is a double meta-field and not an instruction header, instruction meta-field H4 is not an instruction header. The instruction prediction information of instruction meta-fields H4 to Hn may be obtained similarly.

Referring to FIG. 5B, the logic solution corresponds to the hypothesis that instruction meta-field H1 is an instruction header. Instruction meta-field H1 may be decoded to determine whether instruction meta-field H1 has a length of a single meta-field (16 bits) or a length of a double meta-field (32 bits). When instruction meta-field H1 has a length of a single meta-field, instruction meta-field H2 is an instruction header. When instruction meta-field H1 has a length of a double meta-field, instruction meta-field H2 is not an instruction header. Instruction meta-field H2 is then decoded to determine whether instruction meta-field H2 is of either a length of a single meta-field (16 bits) or a length of a double meta-field. When instruction meta-field H2 is an instruction header of a single meta-field, instruction meta-field H3 is an instruction header. When instruction meta-field H2 is a single meta-field and not an instruction header, instruction meta-field H3 is an instruction header. Prediction information can be given for instruction meta-fields H4 to Hn similarly.

The second example corresponds to a mixed prediction logic of 16/24/32 bit variable-length instruction set. The instruction encoding lengths of the 16/24/32 bit variable-length instruction set include 16 bits, 24 bits, and 32 bits. The length of each instruction meta-field is 8 bits, and the value of x is 3, indicating that instruction header information of a current instruction meta-field is obtained according to instruction prediction information and decoding information of the previous 3 meta-fields. As shown in the following table, information about whether instruction meta-field H5 is an instruction header may be obtained by viewing decoding information of instruction meta-fields H1 to H4.

| Instruction meta-field H1 | Instruction meta-field H2 | Instruction meta-field H3 | Instruction meta-field H4 | Instruction meta-field H5 |
|---|---|---|---|---|
| 32-bit header | 0 | 0 | 0 | 1 |
| X | 32-bit header | 0 | 0 | 0 |
| X | X | 32-bit header | 0 | 0 |
| X | X | X | 32-bit header | 0 |
| 24-bit header | 0 | 0 | 1 | 0 |
| X | 24-bit header | 0 | 0 | 1 |
| X | X | 24-bit header | 0 | 0 |
| X | X | X | 24-bit header | 0 |
| X | X | 16-bit header | 0 | 1 |
| X | X | X | 16-bit header | 0 |

From the above table, there are several cases for instruction meta-field H4:

If instruction meta-field H1 is an instruction header of a 32-bit instruction, and instruction meta-field H4 is not an instruction header, instruction meta-field 5 is an instruction header.

If instruction meta-field H2 is an instruction header of a 32-bit instruction, and instruction meta-field H4 is not an instruction header, instruction meta-field 5 is not an instruction header.

If instruction meta-field H3 is an instruction header of a 32-bit instruction, and instruction meta-field H4 is not an instruction header, instruction meta-field 5 is not an instruction header.

If instruction meta-field H2 is an instruction header of a 24-bit instruction, and instruction meta-field H4 is not an instruction header, instruction meta-field 5 is an instruction header.

If instruction meta-field H3 is an instruction header of a 24-bit instruction, and instruction meta-field H4 is not an instruction header, instruction meta-field 5 is not an instruction header.

If instruction meta-field H3 is an instruction header of a 16-bit instruction, and instruction meta-field H4 is not an instruction header, instruction meta-field 5 is an instruction header.

When instruction meta-field H4 is an instruction header of a 32-bit instruction, instruction meta-field 5 is not an instruction header.

When instruction meta-field H4 is an instruction header of a 24-bit instruction, instruction meta-field 5 is not an instruction header.

When instruction meta-field H4 is an instruction header of a 16-bit instruction, instruction meta-field 5 is not an instruction header.

Through the above logic, whether instruction meta-field 5 is an instruction header is determined.

For the case of 16/24/32 bit mixed prediction of 16/24/32 bit variable-length instruction set, there are seven hypotheses for the first instruction meta-field (H1) of the instruction packet. Assuming that the first instruction meta-field of the instruction packet is in one of the following cases, instruction header prediction information to be extended for each meta-field can to be solved according to the above logic:

| Ex | Meanings |
|---|---|
| e0 | Not an instruction header, and is the second meta-field of a 32-bit instruction |
| e1 | Not an instruction header, and is the third meta-field of the 32-bit instruction |
| e2 | Not an instruction header, and is the fourth meta-field of the 32-bit instruction |
| e3 | Not an instruction header, and is the second meta-field of a 24-bit instruction |
| e4 | Not an instruction header, and is the third |

-continued

| Ex | Meanings |
|---|---|
| e5 | meta-field of the 24-bit instruction<br>Not an instruction header, and is the second meta-field of a 16-bit instruction |
| e6 | Instruction header |

In some embodiments as described above, whether a next field is an instruction header can be obtained by checking whether a current instruction meta-field is an instruction header, in combination with decoding information of the current instruction meta-field. For example, if the current meta-field is an instruction header, and the decoding information indicates a 32-bit instruction, the next meta-field is not an instruction header. If the current field is not an instruction header, the next meta-field is an instruction header.

Figure 5C:
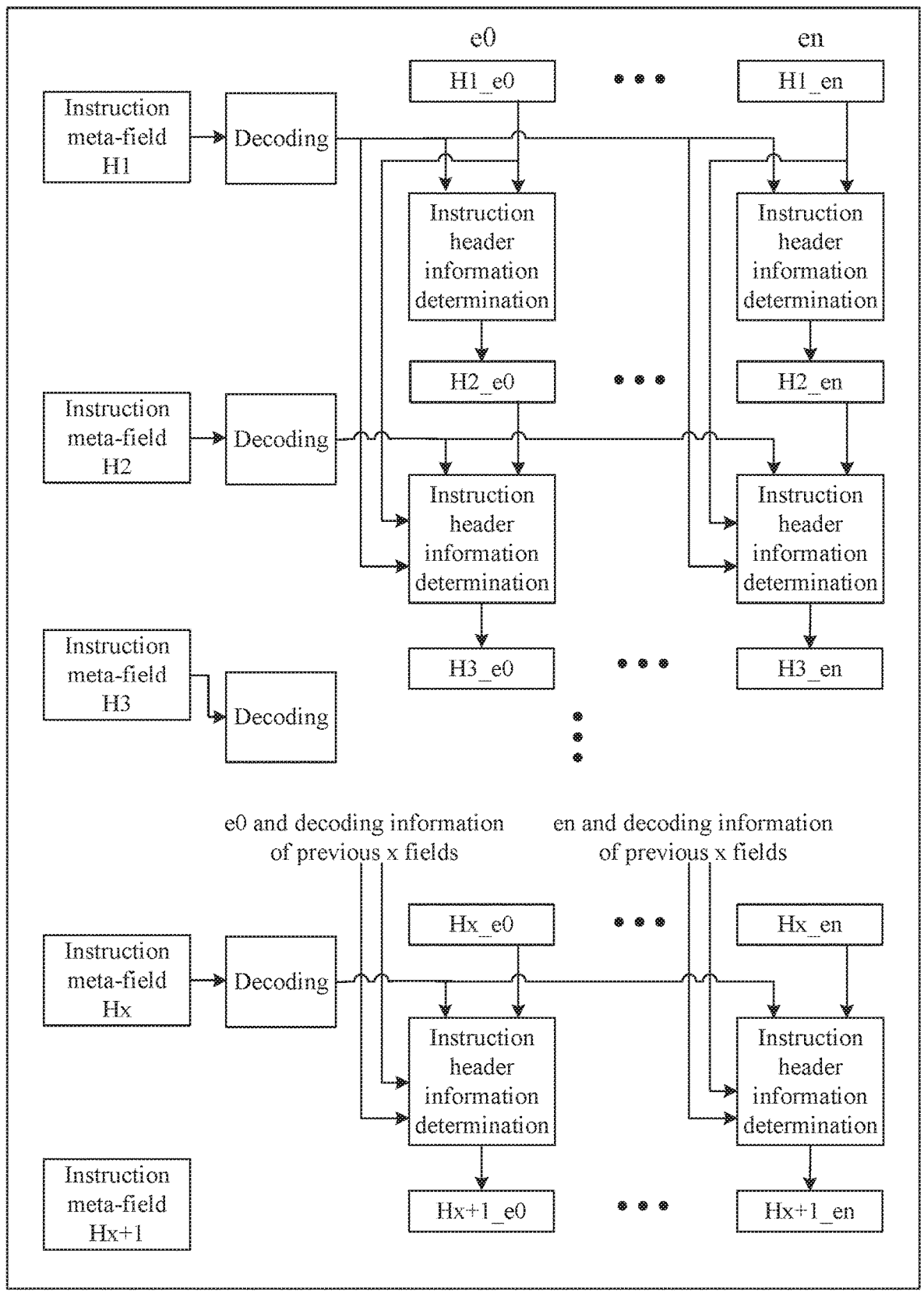
FIG. 5C shows a schematic diagram of an example general prediction logic according to some embodiments of the present disclosure.

FIG. 5C shows a schematic diagram of an example general prediction logic according to some embodiments of the present disclosure. This example general prediction logic is applicable to a process for solving instruction header prediction information for different instruction packet lengths and different instruction encoding lengths:

```
For ex from e0 to en: # assuming that H1 is the header, middle segments,
    and tail of an instruction code,
    # solve information of the next segment in sequence
For Hx from H2 to Hn
``` combining ex(e0-*en*) and decoding information of previous x instruction meta-fields, to obtain ex(e0-*en*) of Hx+1, where H1_*e*[*x*] is prediction information of H1 field corresponding to different instruction encoding lengths, when traversing all hypotheses of (e0-*en*). When L0 is the minimum encoding length in an instruction set, LN is the maximum encoding length in the instruction set, and LE is the length of an instruction meta-field, H1_*e*[*x*] can be determined using the following codes.

```
For the encoding length l from L0 to Ln: # traverse all encoding lengths
    el = l/LE; # a ratio of the encoding length to the length of the
    instruction meta-field
        For le from 2 to el: #
            add a hypothesis H1_e[x]. # indicates that the hypothesis
                is: H1 is the le-th field of the encoding length l
        End
End
```

Referring to FIG. 5C, under the hypothesis that the condition is e0, the instruction header information is determined according to the decoding information of instruction meta-field H1, to obtain instruction prediction information H1-*e*0 of H1. Then the instruction header information is determined according to H1-*e*0 and the decoding information of instruction meta-field H2, to obtain instruction prediction information H2-*e*0 of H2. The rest can be done in similar manner. Through the method of exhaustion based on a limited amount of information, the prediction information of each instruction meta-field can be obtained.

Through the logic of FIG. 5C, after each piece of instruction prediction information is calculated, the instructions and the instruction prediction information are stored in the instruction cache together. In some embodiments, the instruction fetch unit acquires an instruction packet from the instruction cache or off-chip (e.g., when the instruction cache is located off-chip) according an aligning address. The instruction packet includes an instruction and the above-mentioned instruction prediction information. As such, instruction boundary information may be quickly obtained through instruction boundary determination unit 30151.

Figure 6:
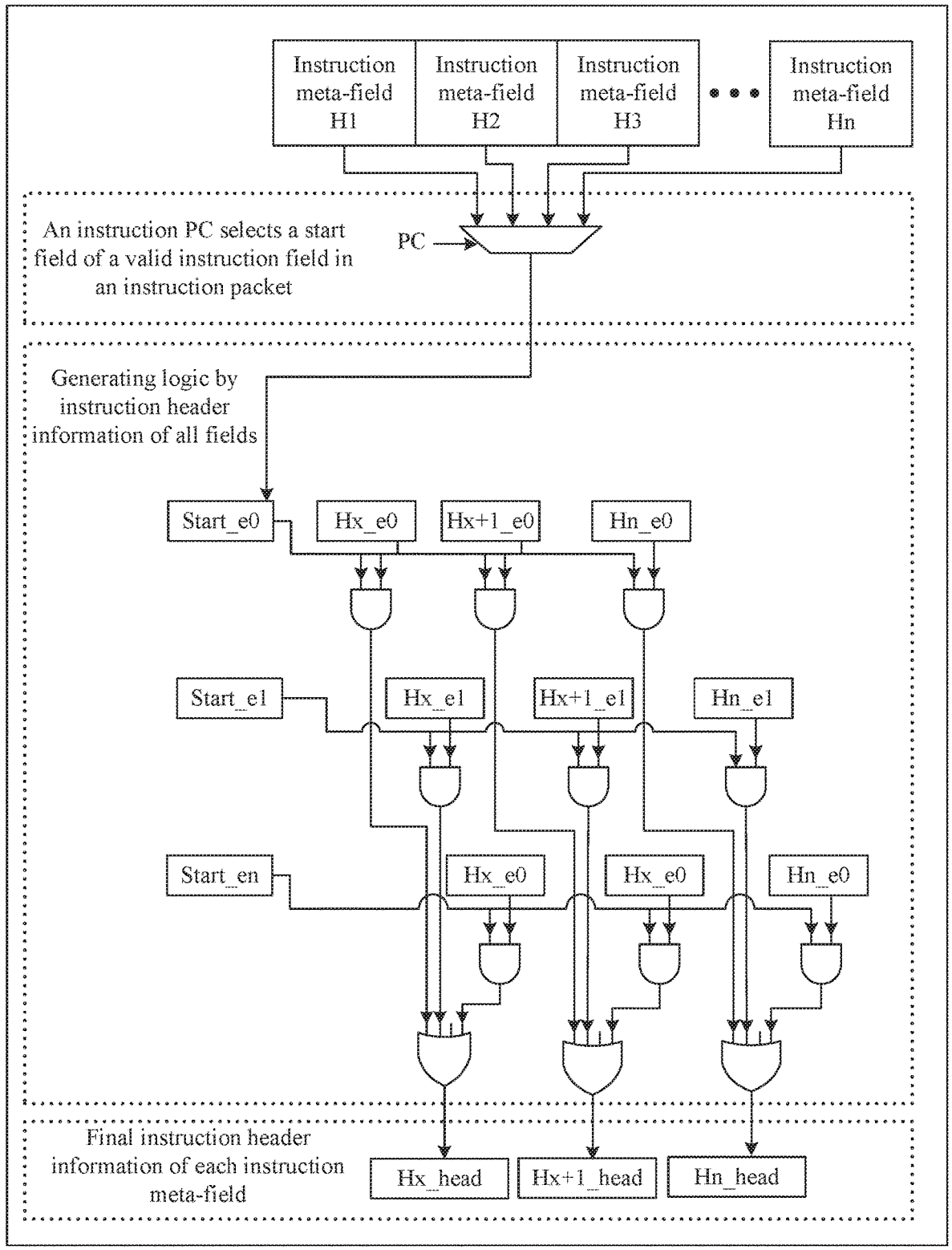
FIG. 6 shows a schematic diagram of an example determination logic of an instruction confirmation unit according to some embodiments of the present disclosure.

FIG. 6 shows a schematic diagram of an example determination logic of instruction determination unit 30151 according to some embodiments of the present disclosure. Referring to FIG. 6, in some embodiments, instruction boundary determination unit 30151 determines a valid instruction meta-field from the instruction packet according to a program pointer (PC), where the starting position of the valid instruction meta-field in the instruction packet is indicated by the program PC. For example, if the instruction packet is 256 bits, 64 bytes, values of the lower 6 bits of the PC indicate the start of the valid meta-field. If the values of the lower 6 bits of the program PC is 8, the valid meta-field starts from the eighth byte. In some embodiments, an instruction meta-field start_ex marked as an instruction header is selected from the instruction meta-field. If instruction prediction information e0-*en* of the corresponding instruction meta-field can be found according to start_ex, an entry with a value of 1 in the prediction information e0-*en* is used as instruction boundary information (hx_head) (the value of x is 0 . . . n). If the instruction prediction information corresponding to start_ex does not contain an entry of 1, it means that there is an error in the instruction prediction, and the instruction boundary information needs to be recalculated. The above logic may be realized through an AND-OR gate, which greatly reduces the logic length.

In principle, if there is no data information in an instruction segment of a program, that is, only instruction information is in the instruction segment, the above method can be used to obtain correct instruction boundary information directly. If the instruction segment of the program contains data, the above method may not be able to obtain correct instruction boundary information. The correct instruction boundary may be recalculated according to the position of the real program PC in the instruction packet, as illustrated in FIG. 7 below.

Figure 7:
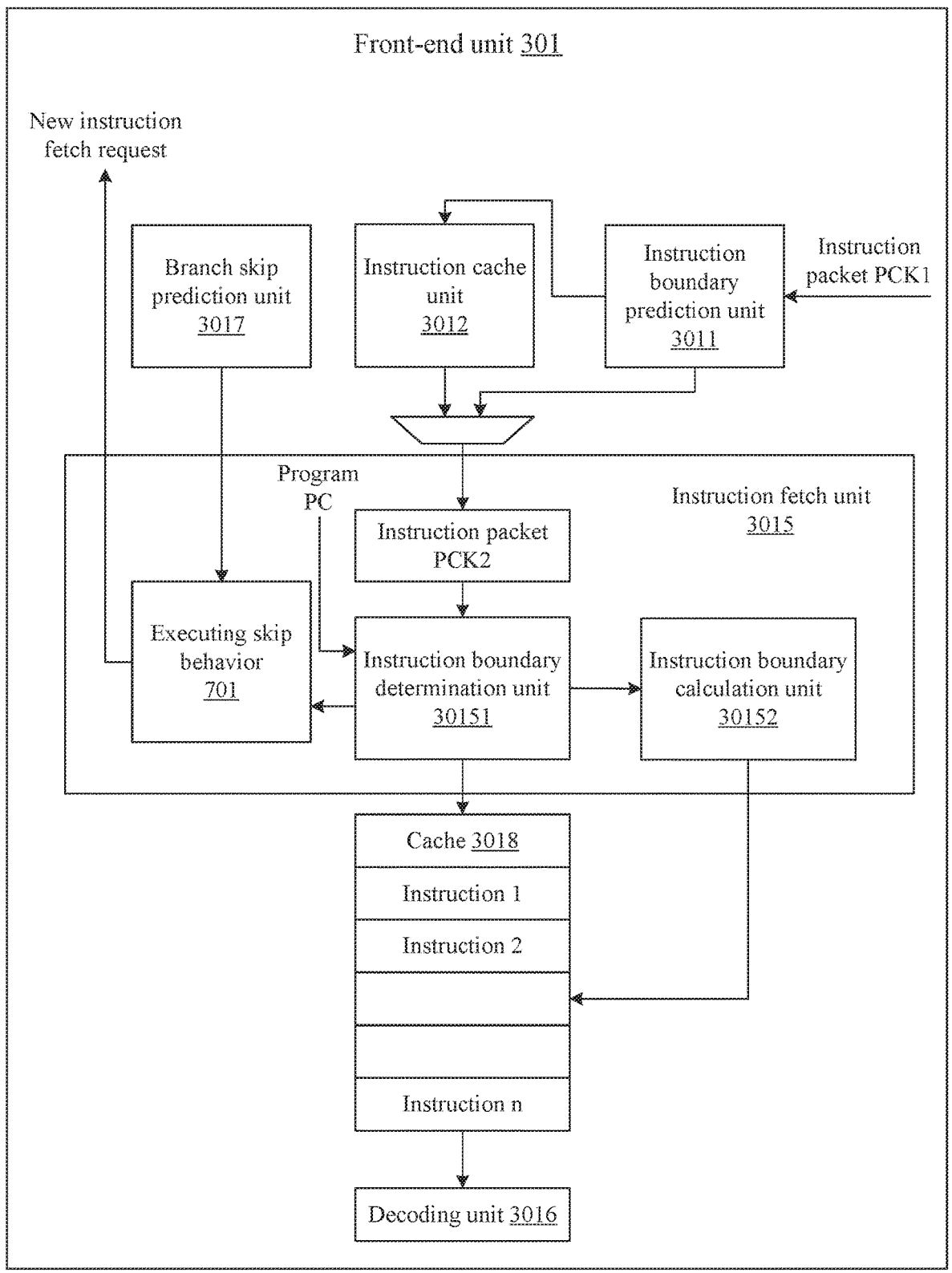
FIG. 7 shows a schematic diagram of an example logic process of a front-end unit according to some embodiments of the present disclosure.

FIG. 7 shows a schematic diagram of an example logic process of front-end unit 301 shown in FIG. 3, according to some embodiments of the present disclosure. As shown in FIG. 7, in some embodiments, instruction boundary determination unit 30151 receives the program PC and instruction packet PCK2 including prediction information added. Instruction boundary determination unit 30151 may then determine an instruction meta-field corresponding to the program PC in instruction packet PCK2. The instruction meta-field may be an instruction header of an instruction. An entry of the instruction header can be found in the instruction prediction information corresponding to the instruction meta-field. The entry and the instruction prediction information corresponding to the entry are the instruction boundary information. One or more instructions may be obtained accordingly. Instruction fetch unit 3015 may then pre-decode the instruction to determine whether the instruction is a branch instruction. If an instruction is a branch instruction, branch skip prediction unit 3017 may be retrieved according to a program PC of the instruction to acquire a target skip address. Skip behavior 701 may be executed according to the target skip address to obtain an instruction packet at the target skip address. At the same time, the instruction can be stored in instruction cache 3018, and decoding unit 3016 can read the instruction therefrom and decode the instruction.

In some embodiments, when instruction boundary determination unit 30151 determines the instruction meta-field corresponding to the program PC in instruction packet PCK2, the instruction meta-field may be an instruction header of an instruction. Alternatively, an entry of the instruction header cannot be found in the instruction prediction information corresponding to the instruction meta-field, indicating that there is an error in the prediction. Accordingly, instruction boundary calculation unit 30152 can be called, e.g., by instruction boundary determination unit 30151, to determine the instruction boundary information.

The instruction boundary prediction method provided by some embodiments of the present disclosure makes the length of the logic for confirming instruction boundary information shorter, and the length of the logic from confirmation of boundary information to execution of a skip behavior also shorter. Accordingly, the method is applicable to a deep instruction pipeline, and can significantly improve the execution efficiency of the instruction pipeline. The instruction boundary prediction method provided by the present disclosure is not affected by the order in which the processor views the instruction streams.

Figure 8:
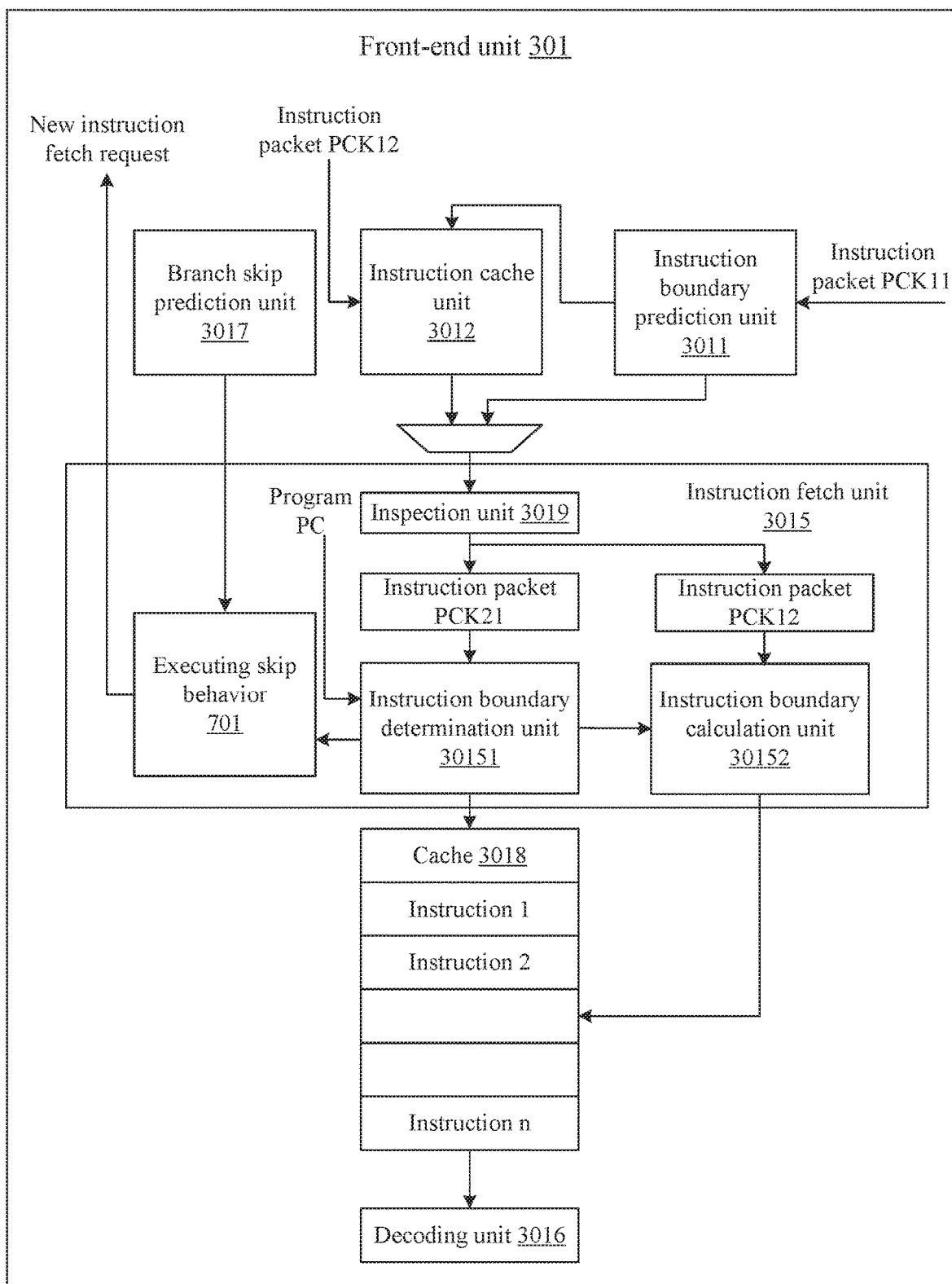
FIG. 8 shows a schematic diagram of an example logic process of a front-end unit according to some embodiments of the present disclosure.

FIG. 8 shows a schematic diagram of an example logic process of front-end unit 301 shown in FIG. 3, according to some embodiments of the present disclosure. The logic process of FIG. 8 may include modified embodiments of those from FIG. 7. FIG. 8 shows an instruction packet PCK11 passing through instruction boundary prediction unit 3011 and an instruction packet PCK12 not passing through instruction boundary prediction unit 3011. The processing flow of PCK11 is similar to the processing flow of PCK1 shown in FIG. 7, and is not repeated here. Instruction packet PCK12 can be directly stored in instruction cache unit 3012. When instruction fetch unit 3015 acquires an instruction packet from instruction cache unit 3012, the instruction packet is inspected by inspection unit 3019. In some embodiments, inspection unit 3019 distinguishes instruction packets PCK21 from PCK12 by determining whether the instruction packet contains instruction prediction information. As shown in FIG. 8, instruction boundary information of instruction packet PCK12 can be calculated by instruction boundary calculation unit 30152, thereby obtaining a plurality of instructions from instruction packet PCK12.

In some embodiment in FIG. 8, two types of hardware logic for processing instructions from a variable-length instruction set are integrated to be applicable to different application scenarios, while taking respective characteristics of the two types of hardware logic into consideration. In some embodiments, instruction prediction information is added to each instruction in the instruction packet. Although the instruction unit may parse out instructions faster, more storage space of the instruction cache may be occupied. By integrating the two types of hardware logic in the same instruction fetch unit, any one of the two types of hardware logic may be used according to the actual application scenario.

The present disclosure may be implemented in hardware or dedicated circuits, software, logic, or any combination thereof. For example, a processing device for implementing the present disclosure can be added in addition to the instruction fetch unit. The processing device can be implemented by hardware logic, software, or firmware. The processing device may fetch an instruction packet from a cache, add instruction prediction information for each instruction, and then return the instructions into the instruction cache. At the same time, the hardware logic of the instruction fetch unit can be modified, so that the instruction fetch unit may use the instruction prediction information to obtain instruction boundary information in some preferred embodiments implemented as the technical solution of the embodiments of the present disclosure. It is appreciated that the present disclosure is not intended to be limiting. The device and method described herein may further be reconstructed by hardware, software, back members, dedicated circuits or logic, general-purpose hardware or controller or other computing devices, or some combinations thereof. If involved, the circuit design of the present disclosure can be implemented in various components such as an integrated circuit module.

The embodiments may further be described using the following clauses:

1. An instruction processing device for processing instructions of a variable-length instruction set, comprising:
    an instruction boundary prediction unit including circuitry configured to acquire an instruction packet of the variable-length instruction set and add instruction prediction information to a plurality of instruction meta-fields in the instruction packet; and
    an instruction pipeline structure comprising an instruction fetch unit including an instruction boundary determination unit including circuitry configured to determine instruction boundary information according to the instruction prediction information to obtain one or more instructions in the instruction packet.

2. The instruction processing device according to clause 1, wherein the instruction boundary prediction unit comprises circuitry configured to obtain the instruction prediction information of one or more instruction meta-fields by performing:
    determining a plurality of possible settings of a first instruction meta-field in the instruction packet of the variable-length instruction set; and
    determining instruction prediction information of a current instruction meta-field according to instruction prediction information and decoding information of a previous instruction meta-field.

3. The instruction processing device according to clause 2, wherein the instruction prediction information of the current instruction meta-field is determined according to instruction prediction information and decoding information of a number of previous instruction meta-fields, the number being associated with a maximum instruction encoding length in the variable-length instruction set and a length of an instruction meta-field.

4. The instruction processing device according to any of clauses 1-3, wherein the instruction boundary determination unit comprises circuitry configured to:
    determine an instruction meta-field corresponding to a program pointer;
    obtain instruction prediction information of the instruction meta-field corresponding to the program pointer;
    determine whether the obtained instruction prediction information contains an entry indicating an instruction header; and
    in accordance with the determination that the instruction prediction information of the instruction meta-field corresponds to the program pointer contains the entry indicating the instruction header, apply the entry to the instruction boundary information, and the one or more instructions are obtained based on the instruction boundary information.

5. The instruction processing device according to claim 4, wherein in accordance with the determination that the instruction prediction information of the instruction meta-field corresponds to the program pointer does not contain the entry indicating the instruction header, the instruction boundary determination unit comprises circuitry configured to call instruction boundary calculation unit to determine the instruction boundary information.

6. The instruction processing device according to any of clauses 1-5, further comprising an instruction cache for caching the instruction packet with the added instruction prediction information.

7. The instruction processing device according to any of clauses 1-6, wherein the instruction processing device is a processor core.

8. The instruction processing device according to any of clauses 1-6, wherein the instruction processing device is a processor.

9. An instruction processing method, comprising:
acquiring an instruction packet of a variable-length instruction set, and adding instruction prediction information to a plurality of instruction meta-fields in the instruction packet; and
obtaining one or more instructions from the instruction packet at an instruction fetch stage of an instruction pipeline based on instruction boundary information determined according to the instruction prediction information.

10. The instruction processing method according to clause 9, wherein the instruction prediction information of each instruction meta-field is obtained by performing:
determining a plurality of possible settings of a first instruction meta-field in the instruction packet of the variable-length instruction set; and
determining instruction prediction information of a current instruction meta-field according to instruction prediction information and decoding information of a previous instruction meta-field.

11. The instruction processing method according to clause 10, wherein the instruction prediction information of the current instruction meta-field is determined according to instruction prediction information and decoding information of a number of previous instruction meta-fields, the number being associated with a maximum instruction encoding length in the variable-length instruction set and a length of an instruction meta-field.

12. The instruction processing method according to any of clauses 9-11, further comprising:
determining an instruction meta-field corresponding to a program pointer;
obtaining instruction prediction information of the instruction meta-field corresponding to the program pointer;
determine whether the obtained instruction prediction information contains an entry indicating an instruction header; and
in accordance with the determination that the instruction prediction information of the instruction meta-field corresponds to the program pointer contains the entry indicating the instruction header, applying the entry to the instruction boundary information, and obtaining the one or more instructions based on the instruction boundary information.

13. The instruction processing method according to clause 12, further comprising:
in accordance with the determination that the instruction prediction information of the instruction meta-field corresponding to the program pointer does not contain the entry indicating the instruction header, calling the instruction boundary calculation unit to determine the instruction boundary information.

14. The instruction processing method according to any of clauses 9-13, further comprising: caching the instruction packet with the added instruction prediction information.

15. A computer system comprising:
a memory; and
a processor coupled to the memory, the processor comprising:
an instruction boundary prediction unit including circuitry configured to acquire an instruction packet of a variable-length instruction set and add instruction prediction information to a plurality of instruction meta-fields in the instruction packet; and
an instruction pipeline structure comprising an instruction fetch unit including an instruction boundary determination unit including circuitry configured to determine instruction boundary information according to the instruction prediction information to obtain one or more instruction in the instruction packet.

16. A system on chip comprising an instruction processing device, the instruction processing device comprising:
an instruction boundary prediction unit including circuitry configured to acquire an instruction packet of the variable-length instruction set and add instruction prediction information to a plurality of instruction meta-fields in the instruction packet; and
an instruction pipeline structure comprising an instruction fetch unit including an instruction boundary determination unit including circuitry configured to determine instruction boundary information according to the instruction prediction information to obtain one or more instructions in the instruction packet.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The above are only preferred embodiments of the present disclosure and are not intended to limit the present disclosure. For those skilled in the art, the present disclosure may have various modifications and changes. Any modification, equivalent replacement, improvement, etc. made within the spirit and principle of the present disclosure should be included in the scope of protection of the present disclosure.

The invention claimed is:

1. An instruction processing device for processing instructions of a variable-length instruction set, comprising:
an instruction boundary prediction unit, including circuitry configured to acquire an instruction packet of the variable-length instruction set and to add instruction prediction information to a plurality of instruction meta-fields in the instruction packet; and
an instruction pipeline structure, comprising:
an instruction fetch unit, including an instruction boundary determination unit including circuitry configured to determine instruction boundary information according to the instruction prediction information to obtain one or more instructions in the instruction packet.

2. The instruction processing device according to claim 1, wherein the instruction boundary prediction unit comprises circuitry configured to obtain the instruction prediction information of one or more instruction meta-fields by performing:

determining a plurality of possible settings of a first instruction meta-field in the instruction packet of the variable-length instruction set; and determining instruction prediction information of a current instruction meta-field according to instruction prediction information and decoding information of a previous instruction meta-field.

3. The instruction processing device according to claim 2, wherein the instruction prediction information of the current instruction meta-field is determined according to instruction prediction information and decoding information of a number of previous instruction meta-fields, the number being associated with a maximum instruction encoding length in the variable-length instruction set and a length of an instruction meta-field.

4. The instruction processing device according to claim 2, wherein the instruction boundary determination unit comprises circuitry configured to:

determine an instruction meta-field corresponding to a program pointer;

obtain instruction prediction information of the instruction meta-field corresponding to the program pointer;

determine whether the obtained instruction prediction information contains an entry indicating an instruction header; and in accordance with the determination that the instruction prediction information of the instruction meta-field corresponds to the program pointer contains the entry indicating the instruction header, apply the entry to the instruction boundary information, and the one or more instructions are obtained based on the instruction boundary information.

5. The instruction processing device according to claim 4, wherein, in accordance with the determination that the instruction prediction information of the instruction meta-field corresponds to the program pointer does not contain the entry indicating the instruction header, the instruction boundary determination unit comprises circuitry configured to call instruction boundary calculation unit to determine the instruction boundary information.

6. The instruction processing device according to claim 1, further comprising an instruction cache for caching the instruction packet with the added instruction prediction information.

7. The instruction processing device according to claim 1, wherein the instruction processing device is a processor core.

8. The instruction processing device according to claim 1, wherein the instruction processing device is a processor.

9. An instruction processing method, comprising:

acquiring an instruction packet of a variable-length instruction set, and adding instruction prediction information to a plurality of instruction meta-fields in the instruction packet, wherein the instruction prediction information of each instruction meta-field is obtained by performing:

determining a plurality of possible settings of a first instruction meta-field in the instruction packet of the variable-length instruction set; and determining instruction prediction information of a current instruction meta-field according to instruction prediction information and decoding information of a previous instruction meta-field; and obtaining one or more instructions from the instruction packet at an instruction fetch stage of an instruction pipeline based on instruction boundary information determined according to the instruction prediction information.

10. The instruction processing method according to claim 9, wherein the instruction prediction information of the current instruction meta-field is determined according to instruction prediction information and decoding information of a number of previous instruction meta-fields, the number being associated with a maximum instruction encoding length in the variable-length instruction set and a length of an instruction meta-field.

11. The instruction processing method according to claim 9, further comprising:

determining an instruction meta-field corresponding to a program pointer;

obtaining instruction prediction information of the instruction meta-field corresponding to the program pointer;

determine whether the obtained instruction prediction information contains an entry indicating an instruction header; and in accordance with the determination that the instruction prediction information of the instruction meta-field corresponds to the program pointer contains the entry indicating the instruction header, applying the entry as the instruction boundary information, and obtaining the one or more instructions based on the instruction boundary information.

12. The instruction processing method according to claim 11, further comprising:

in accordance with the determination that the instruction prediction information of the instruction meta-field corresponding to the program pointer does not contain the entry indicating the instruction header, calling the instruction boundary calculation unit to determine the instruction boundary information.

13. The instruction processing method according to claim 9, further comprising:

caching the instruction packet with the added instruction prediction information.

14. A computer system comprising:

a memory; and a processor coupled to the memory, the processor comprising:

an instruction boundary prediction unit, including circuitry configured to acquire an instruction packet of a variable-length instruction set and to add instruction prediction information to a plurality of instruction meta-fields in the instruction packet; and an instruction pipeline structure comprising:

an instruction fetch unit, including an instruction boundary determination unit including circuitry configured to determine instruction boundary information according to the instruction prediction information to obtain one or more instruction in the instruction packet.

15. A system on chip comprising an instruction processing device, the instruction processing device comprising:

an instruction boundary prediction unit, including circuitry configured to acquire an instruction packet of the variable-length instruction set and to add instruction prediction information to a plurality of instruction meta-fields in the instruction packet; and an instruction pipeline structure comprising:

an instruction fetch unit, including an instruction boundary determination unit including circuitry configured to determine instruction boundary information according to the instruction prediction information to obtain one or more instructions in the instruction packet.

* * * * *